Oct. 9, 1923.
ST. CHARLES JACOBS
TRAVELING SWING
Filed March 23, 1920
1,469,910
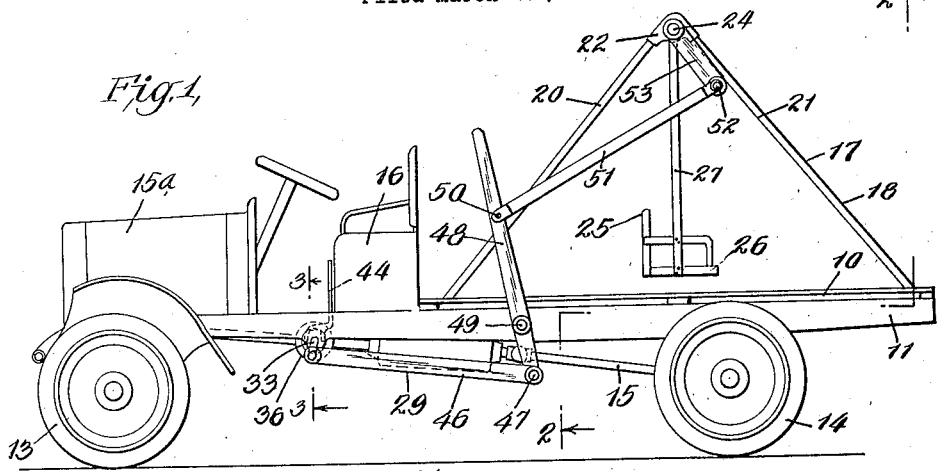
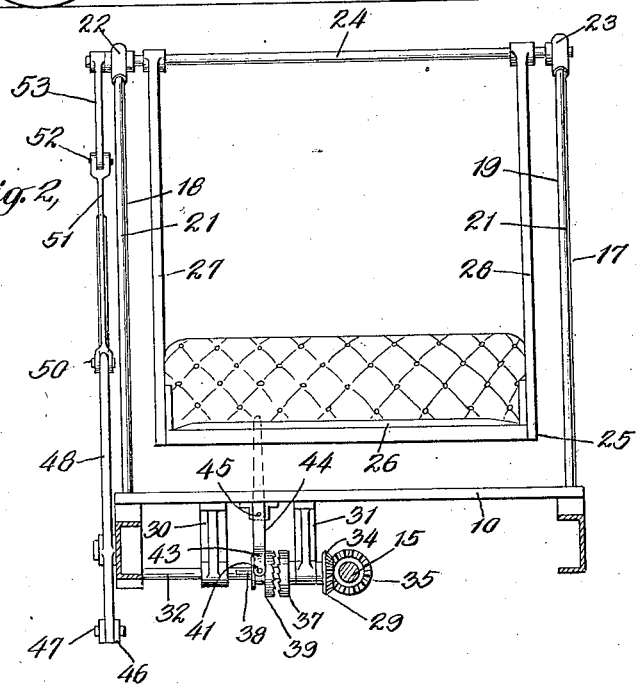
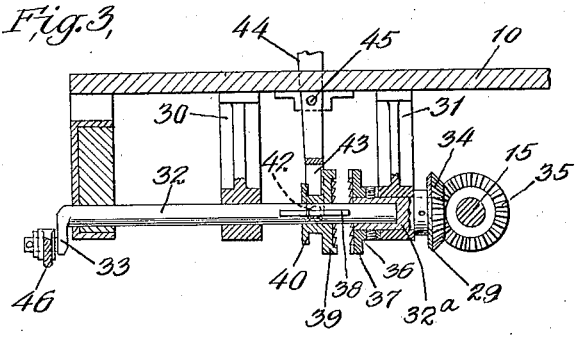
INVENTOR
St Charles Jacobs
BY his ATTORNEY Patented Oct. 9, 1923.

1,469,910

UNITED STATES PATENT OFFICE.

ST. CHARLES JACOBS, OF CONEY ISLAND, BROOKLYN, NEW YORK.

TRAVELING SWING.

Application filed March 23, 1920. Serial No. 368,085.

*To all whom it may concern:*

Be it known that I, ST. CHARLES JACOBS, a citizen of the United States, and a resident of Coney Island, borough of Brooklyn, in the county of Kings and State of New York, have invented a certain new and useful Improvement in a Traveling Swing, of which the following is a full, clear, and exact specification.

This invention relates more particularly to a class of amusement apparatus.

My invention has for its object primarily to provide an apparatus designed to be employed especially for amusement purposes by allowing children and other persons to enjoy the pleasures of a swing, and which is of a power driven type whereby the apparatus may travel to various localities at public resorts and elsewhere so that the public not having accessible amusements may enjoy a healthful and agreeable pastime. The invention consists essentially of providing a platform on a vehicle having a drive shaft adapted to be driven by an engine, and on the platform is an upwardly protruding frame with a swing suspended therefrom above the platform. Associated with the swing and with the drive shaft of the vehicle is a form of mechanism which is operable by the operation of the drive shaft when driven by the engine for causing the swing to be operated, and with the swing operative mechanism is associated manually operative means whereby the mechanism may be connected to or disconnected from the drive shaft of the vehicle.

Another object of the invention is to provide mechanism whereby the swing may be manually operated independently of the power driving mechanism; and a further object of the invention is to provide a traveling swing of a simple and efficient construction which may be made in any suitable size and shape.

With these and other objects in view the invention will be hereinafter more particularly described with reference to the accompanying drawing forming a part of this specification in which similar characters of reference indicate corresponding parts in all the views, and will then be pointed out in the claim at the end of the description.

In the drawing, Figure 1 is a side elevation of one form of traveling swing embodying my invention.

Fig. 2 is an enlarged detail sectional view taken on the line 2—2 of Fig. 1, and Fig. 3 is an enlarged fragmentary sectional view, partly in detail, taken on the line 3—3 of Fig. 1.

The apparatus or swing has a platform 10 which may be provided upon or may constitute the floor of the body of a vehicle, such as an automobile or the like, as 11, having front wheels 13 and rear wheels 14 as well as having a drive shaft 15 for operating the rear wheels, and this drive shaft is driven by an engine, not shown, which is provided in the hood, as 15$^a$, on the vehicle in front of the chauffeur's seat 16.

The platform 10 may be of any suitable shape and size, and extending upwardly from the top of this platform is a frame 17. This frame may be of any desired form, though the frame illustrated is composed of two corresponding spaced standards 18 and 19 each of substantially the shape of an inverted V to provide upwardly converging arms or bars or rods 20 and 21. One of the inverted V-shaped standards is arranged at each side of the platform 10 so as to be in alinement, and the arms of the standards are of lengths so that their apices are at a suitable height above the platform, while the free ends of the arms are spread sufficient distances apart on the platform so that the frame will be properly supported. The apexed ends of the arms of the standards are preferably joined by bearings, as 22 and 23, and in these bearings are journaled the ends of a transversely disposed shaft 24 which may be of a length so that one of its ends protrude some distance beyond the bearing 22.

Mounted on the frame 17 is a swing 25 having a seat, as 26, which may be of a size to accommodate one or more persons, and to the ends of the seat are connected the lower ends of two side bars, as 27 and 28, having their upper ends held to the shaft 24 between the standards 18 and 19 of the frame 17. The side bars 27 and 28 of the swing are of lengths so that the seat 26 is spaced a suitable distance above the platform 10, and by arranging the frame and the swing in this manner the swing may be swung back and forth above the platform toward and from the chauffeur's seat 16.

If desired the swing 25 may be operated by causing the drive shaft to be driven by the engine of the vehicle, and to accomplish this I provide a mechanism, as 29. The mechanism 29 may be of any suitable type, though the form of mechanism shown consists of providing on the underside of the platform 10 two spaced depending brackets or bearings, as 30 and 31. In the bearing 30 is journaled a shaft 32 which is disposed rightangularly with relation to the drive shaft 15 and in the bearing 31 is a rotatable bushing, as 32ª. The shaft 32 is of a length so that one of its ends is in spaced proximity to the drive shaft, while the second end of the shaft 32 extends somewhat beyond the edge of the platform 10, and on this protruding end of this shaft is a crank, as 33.

The other end of the shaft 32 is journaled in the bushing 32ª, and on the end of the bushing is held a bevel gear 34 which is in mesh with a bevel gear 35 held on the drive shaft 15 of the vehicle. On the other end of the rotatable bushing 32ª as well as on the shaft 32 between the bearings 30 and 31 is a clutch, as 36, which is operable to cause the rotation of the drive shaft to be imparted to the shaft 32 as well as allowing the shaft 32 to be cut-out from being rotated by the drive shaft. The clutch 36 may be of a well known form consisting of a toothed faced wheel 37 which is fixed on the second end of the rotatable bushing for being rotated with the rotation of the bushing and with the rotation of the bevel gear 34. Protruding laterally from the shaft 32 lengthwise, and in proximity to the toothed wheel 37, is a lug, as 38, and slidable on this shaft as well as being slidable on the lug is another toothed faced wheel 39 having in its passage a slot in which the lug is disposed so that by adjusting the wheel on the shaft and on the lug the wheel 39 will revolve with the rotation of this shaft. The teeth of the wheel 39 are opposed to the teeth of the wheel 37 so that when the wheel 37 is slidably adjusted on the shaft, as explained, both wheels will be releasably engaged whereby they will simultaneously revolve when the shaft 32, and the bushing 32ª with the bevel gears 34 and 35 are driven by the driving of the drive shaft 15. On the face of the toothed wheel 39 opposite to its teeth is an exteriorly grooved annular flange 40, in the groove of which is movably seated the lugs or pins, as 41 and 42, of the fingers of the pronged end 43 provided on the lower end of a lever or handle 44. The lever 44 is upwardly disposed through an opening in the platform 10 of the vehicle so that its second end protrudes some distance above the platform in proximity to the seat 16 of the vehicle, in order to be conveniently operated by a person occupying the seat, and the central part of the lever is fulcrumed, at 45, to the platform of the vehicle. To the crank 33 of the shaft 32 is pivotally held one end of a bar 46 extending longitudinally alongside of the platform 10, and to the second end of this bar is pivoted, at 47, the lower end of a bar or handle 48 which is of a length so that its second end extends some distance above the platform. Part of the handle 48 in spaced proximity to its lower end is pivoted, at 49, to the platform, and to part of this handle in spaced proximity to its upper end is pivoted, at 50, one end of a rod 51 having its second end pivoted, at 52, to the lower end of a crank arm or eccentric, as 53, which extends downwardly from the end of the shaft 24 protruding beyond the frame 17.

When the swing 25 is occupied by one or more persons and the drive shaft 15 of the vehicle is driven by operation of the engine of the vehicle, the swing may be operated by the mechanism 29. This is accomplished by shifting the handle or lever 44 accordingly to cause the toothed faced wheel 39 of the clutch 36 to be slidably moved on the shaft 32 into engagement with the toothed wheel 37 of the clutch. The rotation of the drive shaft 15 will then be imparted to the bevel gears 35 and 34, the bushing 32ª, toothed wheels 37 and 39, and the shaft 32. The crank 33 of the shaft 32 will likewise be revolvably swung, and with this movement the bar 46, lever or handle 48, rod 51 and the eccentric 53 will be moved back and forth to cause the shaft 24 to be partially rotated. The swing with the persons occupying it will thereby be swung in the frame 11 over the platform 10. If desired the swing may be manually operated independently of the operation of the mechanism 29, by switching the handle or lever 44 to free the engagement of the toothed wheel 39 from the toothed wheel 37 of the clutch 36, and the shaft 32 and toothed wheel 39 may then revolve independently of the other parts of the mechanism 29. Then guiding the handle or lever 48 back and forth on its pivot the rod 51 and eccentric 53 will be moved back and forth to partly rotate the shaft 24, and in turn the swing will be swung, as above explained.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

The combination with a swing provided on a motor driven vehicle, a shaft, adapted to be operated by the vehicle drive shaft, a crank on the shaft, a lever pivoted on the body of a vehicle, means connecting the lever and crank whereby when the crank is operated the lever is oscillated and means connecting the lever to the swing whereby the same may be operated.

This specification signed and witnessed this 22d day of March A. D., 1920.

ST. CHARLES JACOBS.

Witnesses:
M. SONENSON,
J. FREDERICK CRYER.